United States Patent
Mutoh et al.

(12) 
(10) Patent No.: US 6,590,527 B2
(45) Date of Patent: Jul. 8, 2003

(54) NAVIGATION SYSTEM, GPS TERMINAL AND NAVIGATION METHOD USING SUPPLEMENTARY DATA IN BROADCAST RADIO WAVE SIGNAL

(75) Inventors: Katsuhiko Mutoh, Obu (JP); Toshiyuki Ito, Toyohashi (JP); Hiroshige Asada, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/041,088

(22) Filed: Dec. 28, 2001

(65) Prior Publication Data

US 2002/0101374 A1 Aug. 1, 2002

(30) Foreign Application Priority Data

Jan. 29, 2001 (JP) .......... 2001-020191

(51) Int. Cl.[7] .......... G01S 5/02; H04B 9/185
(52) U.S. Cl. .......... 342/357.09; 342/357.03
(58) Field of Search .......... 342/357.03, 357.06, 342/357.09, 357.12, 357.15

(56) References Cited

U.S. PATENT DOCUMENTS 6,317,603 B1 * 11/2001 Allison .......... 455/456
6,324,455 B1 * 11/2001 Jackson .......... 701/50
6,400,314 B1 * 6/2002 Krasner .......... 342/357.09

FOREIGN PATENT DOCUMENTS

JP 6-130144 5/1994

* cited by examiner

Primary Examiner—Dao Phan
(74) Attorney, Agent, or Firm—Harness, Dickey & Pierce, PLC

(57) ABSTRACT

A navigation system is constructed to set up navigation function of a GPS terminal by using radio signals of broadcast station before receiving GPS signals from GPS satellites. A GPS monitor server receives on the ground GPS signals transmitted from GPS satellites, a FM multiplex broadcast station transmits, using the radio signals, GPS supplementary information including the Almanac and Ephemeris data in a navigation message of the GPS signals received by the GPS monitor server. A GPS terminal starts, upon reception of the GPS supplementary information, reception of the GPS signals transmitted from the GPS satellites.

19 Claims, 10 Drawing Sheets

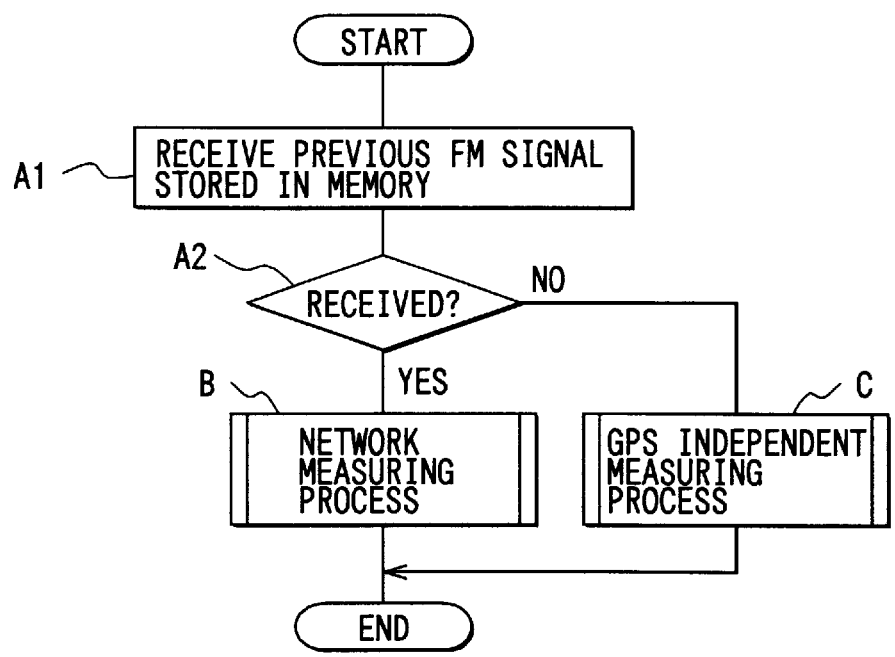
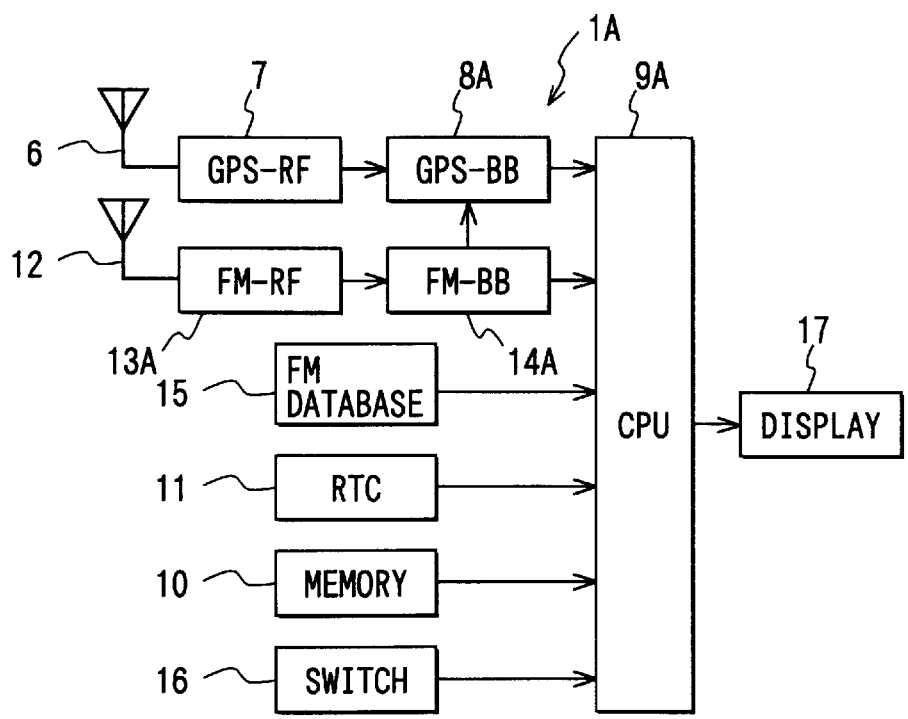

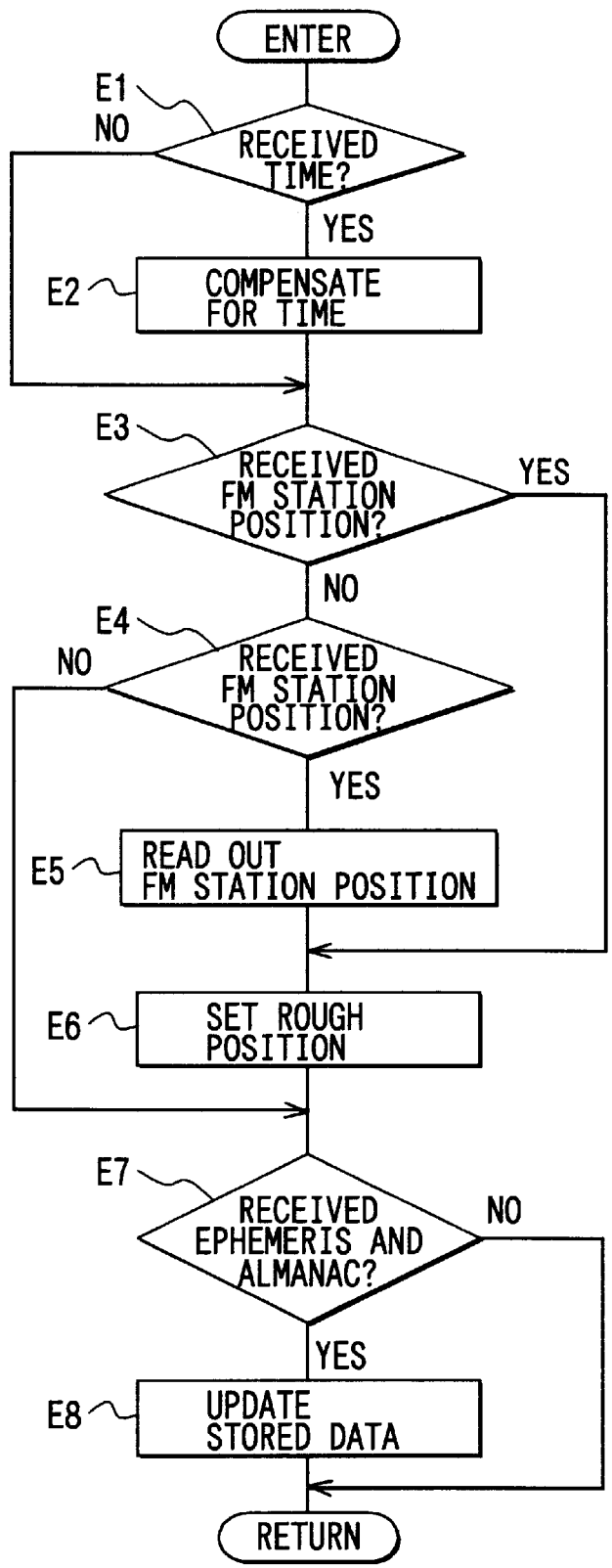

NAVIGATION SYSTEM, GPS TERMINAL AND NAVIGATION METHOD USING SUPPLEMENTARY DATA IN BROADCAST RADIO WAVE SIGNAL

CROSS REFERENCE TO RELATED APPLICATION

This application is based on and incorporates herein by reference Japanese Patent Application No. 2001-20191 filed Jan. 29, 2001.

1. Field of the Invention

The present invention relates to a navigation system, a GPS terminal used in this system and a navigation method, which uses supplementary data transmitted in a broadcast radio wave signal.

2. Background of the Invention

The GPS (Global Positioning System) is now used for measuring, on the ground, the present position of a mobile object such as an automobile, aircraft or vessel with higher accuracy as data such as latitude, longitude and altitude from information pieces included in radio wave signals transmitted from a plurality of GPS satellites revolving on the satellite orbits in the altitude of 20,000 km or higher from the earth by receiving such radio wave signals, for example, by a mobile object moving on the ground.

The information pieces included in the radio wave signals transmitted from the GPS satellites further include navigation messages consisting of the C/A (Coarse/Acquisition) code, Almanac data and Ephemeris data or the like. The Almanac data is the data in relation to rough orbit information of all GPS satellites, while the Ephemeris data is detail data for detecting the position on the orbit of the GPS satellite which has transmitted the radio wave signal.

In general, a GPS terminal receives first all Almanac data transmitted from the GPS satellites before starting execution of navigation. When it is determined appropriate to seize the satellite at the present position from such Almanac data, about four GPS satellites, for example, are selected to obtain the necessary navigation messages by seizing these four GPS satellites.

However, setup of navigation function is delayed because the time of about 12 to 13 minutes are required to receive all Almanac data. Therefore, following services are provided in a part of the system. Namely, a base station installed on the ground always receives the GPS signals transmitted from the GPS satellites, extracts the Almanac data from the navigation messages analyzed, and stores such data in the servers prepared for users.

Here, a GPS terminal user starts, upon acquisition of the Almanac data by making access to the server via a mobile telephone set before driving an apparatus to execute the navigation function, seizure of appropriate GPS satellites based on the acquired Almanac data. With provision of such services, the GPS terminal user can acquire the Almanac data within a short period of time and also can quickly set up the navigation function.

However, in the above system, various procedures are required for users to acquire the Almanac data. It is very troublesome to actively make access to servers. Moreover, an interface is required in the GPS terminal side in order to set up the connection to a mobile telephone system apparatus or the relevant apparatus or the like. Accordingly, the apparatus is complicated.

SUMMARY OF the INVENTION

It is therefore an object of the present invention to provide a navigation system which can quickly set up navigation function of a GPS terminal in a simple structure, and also provide a GPS terminal to be used in the same system.

According to the present invention, a base station receives, on the ground, GPS signals transmitted from GPS satellites. A one-way transmitting station transmits, to the predetermined area, supplementary information including Almanac data in navigation messages of GPS signals received by the base station using radio wave signals. A GPS terminal starts, upon reception of the supplementary information transmitted from the transmitting station, reception of the GPS signals transmitted from the GPS satellites.

When the GPS terminal side is provided with a function to receive the radio wave signals transmitted from the transmitting station, the Almanac data which is already acquired with the base station can be obtained as the supplementary information. Therefore, the Almanac data can be obtained within a short period of time with the GPS terminal, and thereby the navigation function can be set up quickly.

BRIEF DESCRIPTION OF the DRAWINGS

The above and other objects, features and advantages of the present invention will become more apparent from the following detailed description made with reference to the accompanying drawings. In the drawings:

FIG. 4 is a flow diagram showing processes executed when a power switch of the GPS terminal is turned on in the first embodiment;

FIG. 7 is a block diagram showing a GPS terminal used in a second embodiment of the present invention;

FIG. 9 is a flow diagram showing a FM multiplex signal receiving process executed in the second embodiment;

DETAILED DESCRIPTION OF THE PREFERRED EMBODIMENTS

First Embodiment

A first embodiment of the present invention wherein a navigation system of the present invention is applied to a D-GPS (Differential-type GPS) will be explained with reference to FIG. 1 to FIG. 6.

Figure 1:
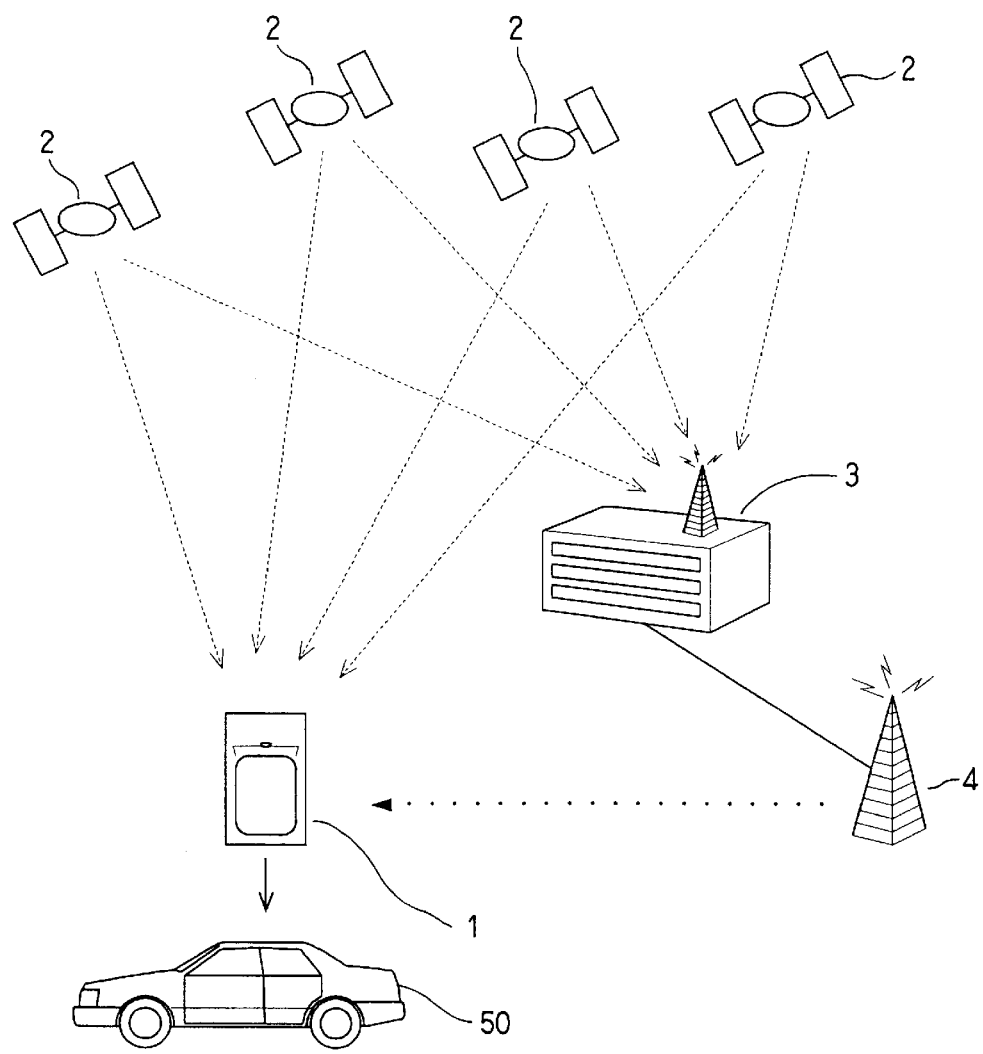
FIG. 1 is a schematic diagram showing a navigation system using a D-GPS according to a first embodiment of the present invention.

In FIG. 1, a GPS terminal 1 is provided to seize and receive radio wave signals transmitted, for example, from four GPS satellites 2 located in the space at this time point. The GPS terminal 1 also displays the position thereof on the ground by measuring latitude and longitude on the ground and latitude of the satellites 2. The GPS terminal 1 is installed, for example, in an automobile 50 for a vehicle navigation system.

A GPS monitor server 3 is provided on the ground as a base station to receive radio wave signals transmitted from the GPS satellites 2. Here, the GPS monitor server 3 is also provided with a function as the D-GPS reference station. The GPS monitor server 3 having received the radio wave signals generates D-GPS compensation data to compensate for calculation of measuring data based on the radio wave signals received from the GPS satellites 2 by comparing the latitude, longitude and altitude data thereof received previously, satellite position data calculated based on the radio wave signals received from a plurality of GPS satellites 2 and measured pseudo distance data. It then transmits such D-GPS compensation data to a FM multiplex broadcast station (one-way transmitting station) 4.

Moreover, the GPS monitor server 3 extracts the Almanac data and Ephemeris data from the navigation messages of the received GPS signals and transmits such data to the FM multiplex broadcast station 4 as the GPS supplementary information.

The FM multiplex broadcast station 4 is a FM station for FM multiplex broadcast simultaneously transmitting, to the predetermined area, character information or the like in combination with an ordinary broadcast program. Therefore, the D-GPS compensation data and the GPS supplementary information are processed and multiplexed as a kind of the data packet like the character information or the like and are then transmitted as a FM broadcast signal from a transmitting antenna. In addition, the FM multiplex broadcast station 4 also transmits the own broadcast station name and coordinate data indicating the position of the own station as the character information.

The GPS terminal 1 seizes and tracks the appropriate GPS satellites 2 by receiving the D-GPS compensation data and GPS supplementary information transmitted with the FM broadcast signal. It also calculates measuring data as will be explained later by adding the D-GPS compensation data to the calculation parameter.

Figure 2:
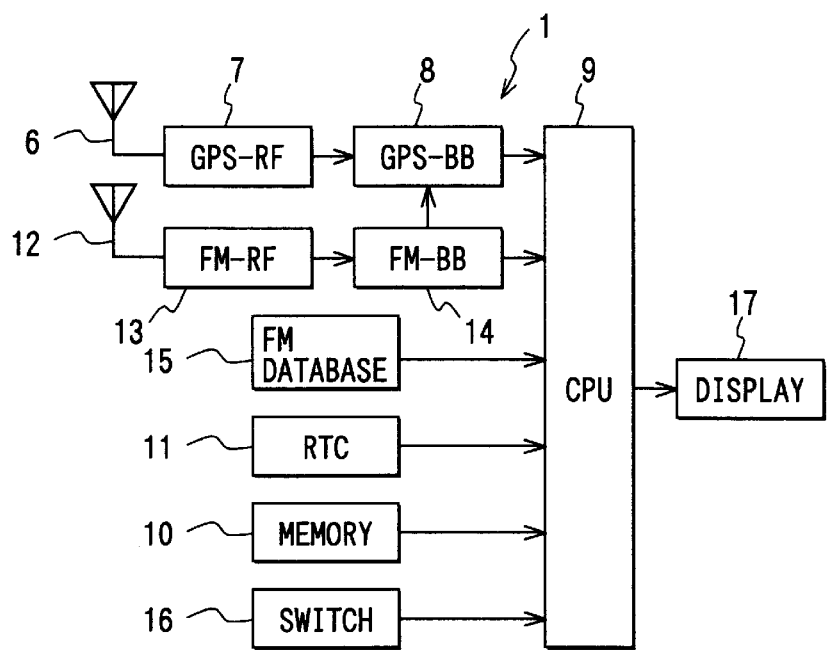
FIG. 2 is a block diagram schematically showing a GPS terminal used in the first embodiment.
Figure 3:
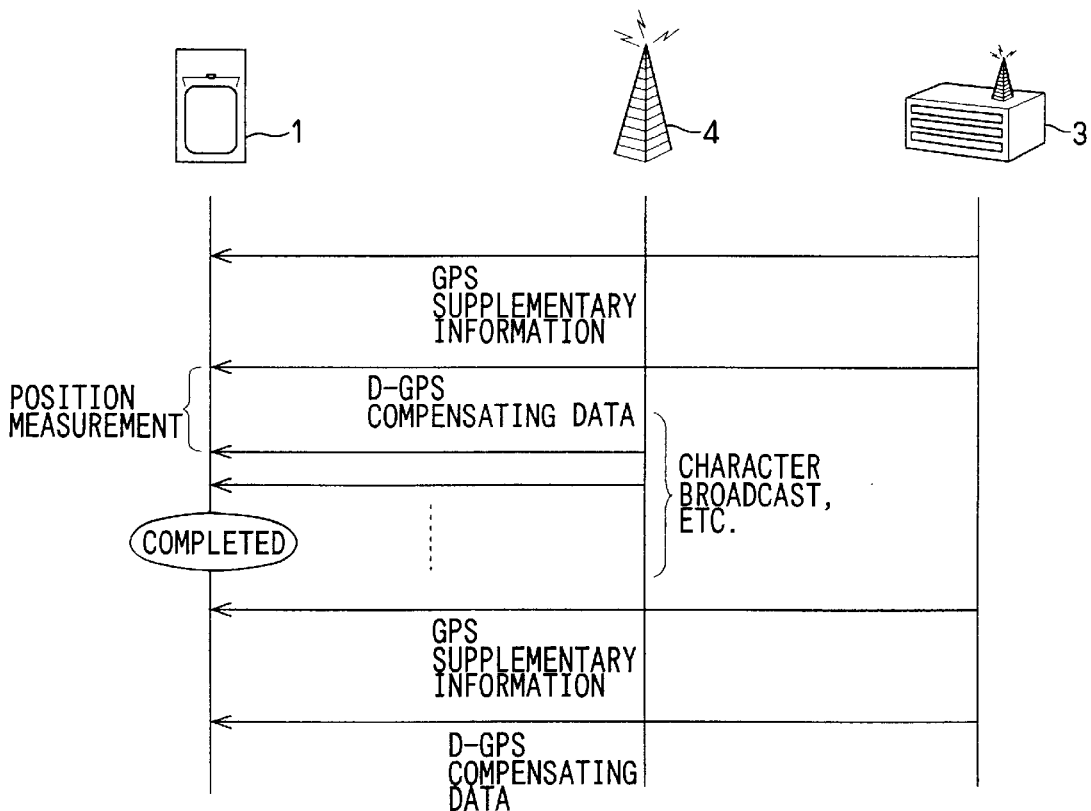
FIG. 3 is a schematic diagram showing an example of signal processing sequence in the navigation system of the first embodiment.

The GPS terminal 1 is constructed as shown in FIG. 2. A CPS antenna 6 receives a radio wave signal transmitted from each GPS satellite 2. The received radio wave signal is applied to a GPS-RF (radio frequency) unit 7. The radio wave signal transmitted from the GPS satellite 2 utilizes a spectrum spread signal obtained by SS (spread spectrum) modulation of the carrier in the frequency of 1575.42 MHz.

The GPS-RF unit 7 amplifies the received radio wave signal and then outputs the amplified signal to a GPS-BB (base band) unit 8 after the frequency conversion to the appropriate intermediate frequency. The GPS-BB unit 8 inversely spreads the given receiving signal by synchronizing the C/A codes assigned to every GPS satellite 2 with elimination of the carrier element and thereafter outputs, to a CPU 9, a navigation message consisting of the Ephemeris data and Almanac data included in the receiving signal through demodulation thereof.

The C/A code is formed of a data sequence of 1023 bits (chips) and is transmitted in the period of 1 ms with the transmission rate of 1.023 Mbps. Moreover, the navigation message consists of one frame of 1500 bits which is transmitted in the transmission rate of 50 bps which is lower than that of the C/A code. Therefore, total of 30 seconds are required for reception of all navigation messages. The former half (18 seconds) of the navigation message is the Ephemeris data, while the latter half (12 seconds) thereof is the Almanac data.

The CPU 9 operates following a control program installed in a built-in ROM (not shown). A memory 10 is formed of an SRM or the like, the data backup of which is assured even if the power supply is turned off. This memory 10 is used as the work area of CPU 9. Moreover, a realtime clock (RTC) 11 measures the time and gives time data to the CPU 9.

Meanwhile, a FM antenna 12 receives, the FM broadcast signal in the frequency of about 76 MHz to 90 MHz transmitted from the FM multiplex broadcast station 4 and outputs the signal to a FM-RF unit 13. The FM-RF unit 13 demodulates an audio signal and a character signal included in the FM broadcast signal and then outputs these signals to a FM-BB unit 14. The FM-BB unit 14 extracts the D-GPS compensation data and GPS supplementary information included in the character data and then outputs these signals to the CPU 9 via the GPS-BB unit 8.

A FM station database 15 is provided with the data in regard to position information of various FM broadcast stations, transmission areas of such stations and transmission frequencies thereof or the like. The CPU 9 reads, from the FM station database 15, the frequency of FM station corresponding to the transmission area to which the current position obtained belongs or reads the position information of the FM broadcast station from the FM broadcast name obtained.

A switch unit 16 is formed of switches with which the user can realize various manipulation inputs of the GPS terminal 1. Operation signals are outputted to the CPU 9. Moreover, a display unit 17 is formed, for example, of a liquid crystal display used to display the coordinate data of the current position obtained with the CPU 9.

The D-GPS compensation data includes communication data indicating the operating condition (normal operation) of all GPS satellites and the D-GPS reference station, D-GPS data ID for switching the contents item of this communication data, compensation data set of eight GPS satellites 2 from #1 to #8 and compensation time indicating the reference compensation time of the compensation data set. Moreover, the compensation data set is formed of user differential distance error index, ID numbers of the GPS satellites 2, pseudo-distance compensation value, pseudo-distance variation rate compensation value and Ephemeris data issuing number, or the like.

Next, the control program of the CPU 9 and operations of the GPS terminal 1 in this first embodiment will be explained with reference to FIG. 4 to FIG. 6. The program shown in FIG. 4 is executed when a power switch of the GPS terminal 1 is turned on. The CPU 9 receives first in trial (step A1), with reference to the memory 10, the FM broadcast signal from the FM multiplex broadcast station 4 which has been received before the power switch is turned off in the last time. The CPU 9 executes, when the broadcast signal of the FM multiplex broadcast station 4 is received (step A2, "YES"), the network measuring process (step B) shown in FIG. 5. Moreover, if the broadcast signal of the FM multiplex broadcast station 4 cannot be received ("NO"), the CPU 9 executes the GPS independent measuring process (step C).

Figure 5:
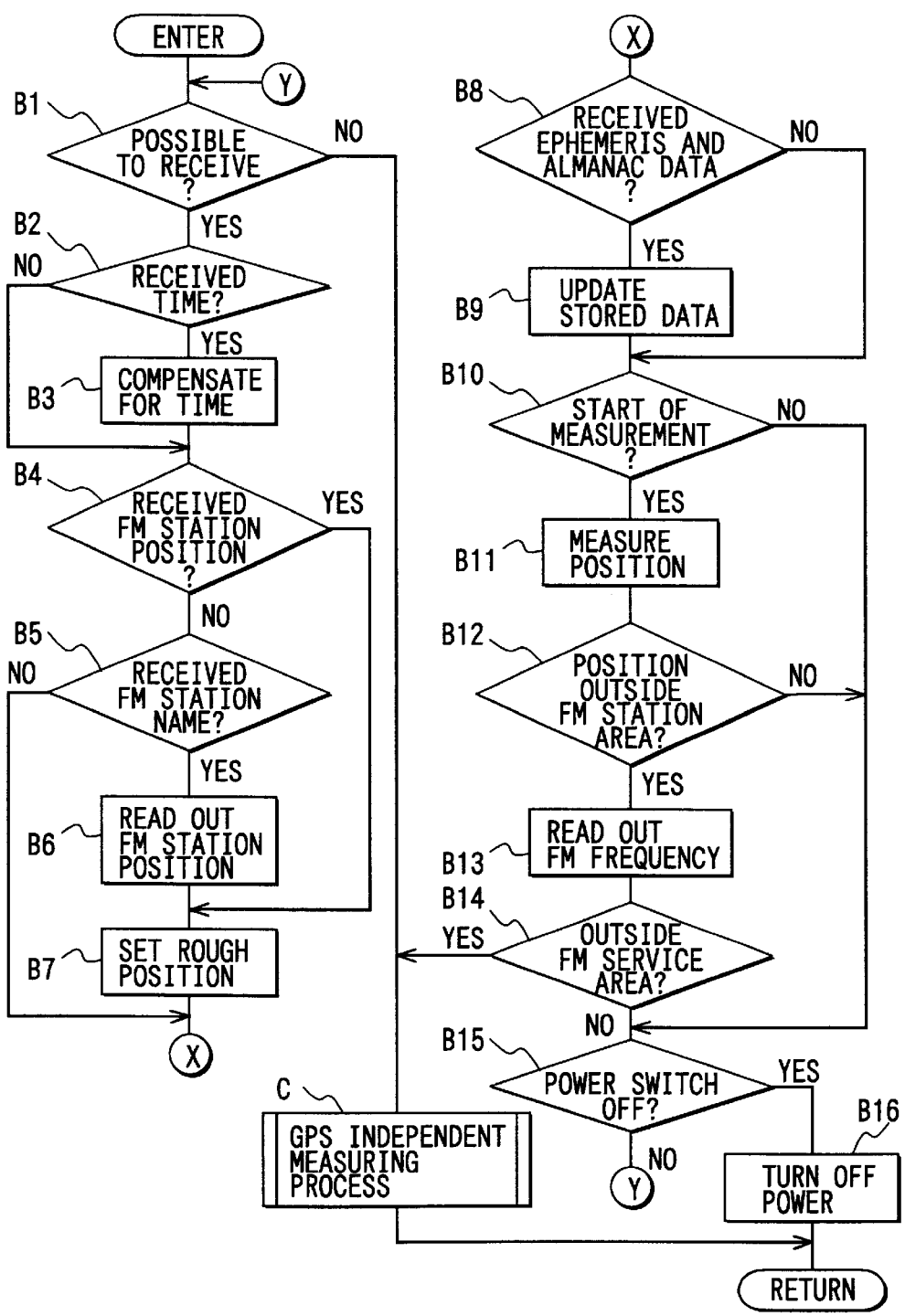
FIG. 5 is a flow diagram showing a network measuring process executed in the first embodiment.

In the network measuring process (step B) shown in FIG. 5, the CPU 9 checks whether it can receive again the broadcast signal of the FM multiplex broadcast station 4 or not (step B1). If reception is impossible at this time point ("NO"), the CPU 9 starts the GPS independent measuring process (step C). Moreover, when reception is possible even at this time point ("YES"), the CPU 9 determines whether the time information transmitted from the FM multiplex broadcast station 4 is received or not (step B2).

The time information is usually transmitted as an audio signal but when the time information is extracted, in the GPS terminal 1, from the audio signal with the FM-BB unit 14, it is outputted to the CPU 9 via the GPS-BB unit 8 in the format of data indicating that the time information has been received.

The CPU 9 compensates, upon reception of the time information at step B2 ("YES"), for the time of RTC 11 based on the time information reception time point (step B3) and then shifts its processing to step B4. The CPU 9 shifts its processing to step B4, if the CPU 9 does not receive the time information ("NO"). Thereby, the GPS terminal 1 accurately evaluates a time stamp added to the navigation message data transmitted from the GPS monitor server 3 to determine the validity of data by compensating for the time of RTC 11.

The CPU 9 determines, at step B4, whether it has received or not the position information of the FM multiplex broadcast station 4 with the character information. When the position information is received ("YES"), the CPU 9 shifts its processing to step B7 and when this information is not received ("NO"), the CPU 9 shifts its processing to step B5. Moreover, the CPU 9 determines, at step B5, whether it has received or not the broadcast station name of the FM multiplex broadcast station 4 as the character information. When the broadcast station name is received ("YES"), the CPU 9 reads out the position information of the FM broadcast station from the FM station database 15 (step B6) to set up the position of the GPS terminal 1 (step B7).

Subsequently, at step B8, the CPU 9 determines whether it has received or not the Ephemeris and Almanac data with the GPS supplementary information transmitted from the FM multiplex broadcast station 4. When these data are received ("YES"), the CPU 9 updates these data stored in the memory 10 (step B9). Thereafter, the CPU 9 determines whether the measurement should be started or not depending on the manipulation of the user (step B10). Moreover, if these data cannot be received at step B8, the CPU 9 shifts its processing to step B10.

When the user executes the manipulation to start the measurement with the switch unit 16 (step B10, "YES"), the CPU 9 starts reception of the GPS signals transmitted from the GPS satellites 2 via the GPS-RF unit 7 and GPS-BB unit 8 for the measuring process (step B11). Moreover, if the user does not execute the manipulation ("NO"), the CPU 9 shifts its processing to step B15.

When the Ephemeris and Almanac data transmitted at step B8 from the FM multiplex broadcast station 4 are be received at step B11, the CPU 9 can quickly seize the GPS satellite 2 based on the data updated at step B9. Moreover, if such data are not received, the GPS satellite 2 can be seized based on the data before it is updated.

In the case of seizing the GPS satellite 2 in the measuring process of step B11, the GPS satellite 2 to be seized can be selected more quickly depending on the rough position by utilizing the rough position information obtained at step B7 from the FM multiplex broadcast station 4.

In the subsequent step B12, the CPU 9 obtains the present position at this time point and shifts its processing to step B15, if the present position is not located ("NO") at the outside of the transmission area of the FM multiplex broadcast station 4 of which signal has been received by the GPS terminal 1 before the measuring process. Moreover, when the present position is located at the outside of such transmission area ("YES"), the CPU 9 reads out, from the FM station database 15, the transmission frequency of the FM multiplex broadcast station 4 corresponding to the transmission area to which the present position belongs (step B13).

Next, the CPU 9 obtains again the present position at this time point and shifts its processing to the GPS independent measuring process when the present position is located outside the transmission area of the FM multiplex broadcast station 4 of which frequency is read by the GPS terminal 1 at step B13 (step B14, "YES"). Moreover, when the present position is located within the transmission area ("NO"), the CPU 9 determines whether the user has manipulated or not to turn off the power switch (step B15). If the user does not execute such manipulation, the CPU 9 returns to step B1. If the user has executed such manipulation, the power is turned off (step B16), thus ending this routine.

As explained above, the transmission area is checked repeatedly, because it is required to surely obtain the GPS supplementary information from the FM multiplex broadcast station 4 by frequently checking such transmission area due to the reason that possibility for going out of the predetermined transmission area during movement of the automobile 50 in comparatively higher speed becomes high.

Figure 6:
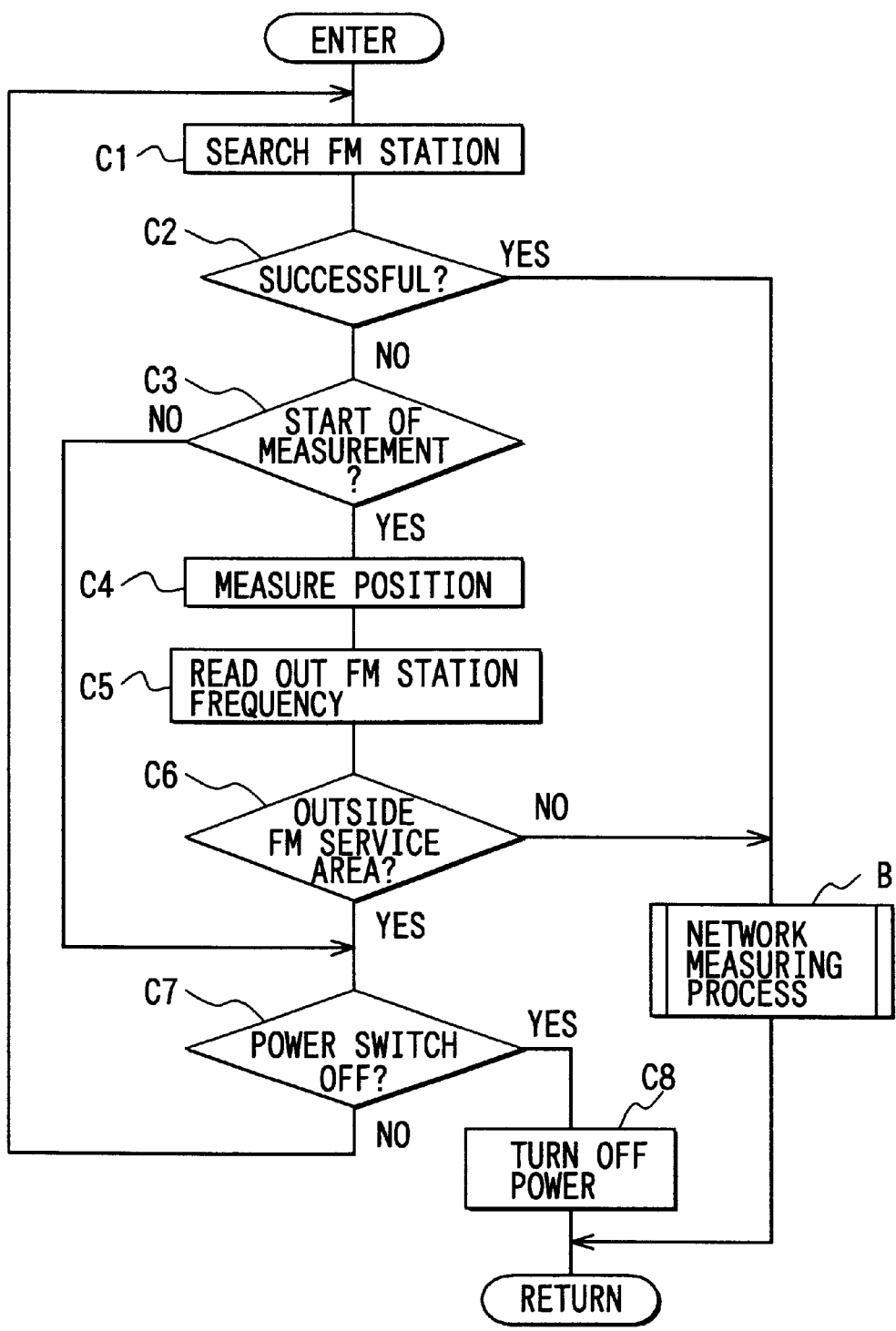
FIG. 6 is a flow diagram showing a GPS individual measuring process executed in the first embodiment.

The CPU 9 executes the GPS independent measuring process of step C as shown in FIG. 6. The CPU 9 first automatically changes the receiving frequency in the FM-RF unit 13 to search the FM multiplex broadcast station which may be received at this time point (step C1). When the signal from any FM broadcast station 4 can be received as a result of successful search (step C2, "YES"), the CPU 9 shifts its processing at this time point to the network measuring process B to obtain in trial the GPS supplementary information as shown in FIG. 4.

Meanwhile, if a signal from a certain FM multiplex broadcast station 4 is not received even with the search at step C1 (step C2, "NO"), the CPU 9 determines, as in the case of step B10, whether the user has executed or not the manipulation to start the measurement (step C3). When the user has executed the manipulation ("YES"), the CPU 9 starts reception of the GPS signal transmitted from the GPS satellites 2 for the measuring process (step C4). Moreover, if the user does not execute the manipulation ("NO"), the CPU 9 shifts its processing to step C7.

The measuring process at step C4 is usually executed by seizing the appropriate GPS satellite 2 and thereby obtaining all Almanac data from the GPS signal.

Next, as in the case of step B13, the CPU 9 reads out, from the FM station database 15, the frequency of the FM multiplex broadcast station 4 corresponding to the transmission area based on the result of measurement at step C4 (step C5). Thereafter, the CPU 9 obtains again the present position at this time point and determines whether the user has executed or not the manipulation to turn off the power supply (step C7) when the GPS terminal 1 is located outside the transmission area of the FM multiplex broadcast station 4 of which frequency is read out at step C5 (step C6, "YES"). When the user does not execute such manipulation, the CPU 9 returns to step C1. When the user has executed such manipulation, the power is turned off (C8), thus ending this routine.

Moreover, when the GPS terminal 1 is located within the transmission area of the FM multiplex broadcast station 4 at step C6 ("NO"), the CPU 9 shifts its processing to the network measuring process at this time point.

As explained above, according to this embodiment, the GPS monitor server 3 receives, on the ground, the GPS signals transmitted from the GPS satellites 2 and the FM multiplex broadcast station 4 transmits, with the radio wave signal, the GPS supplementary information including the Almanac and Ephemeris data in the navigation message of the GPS signal received by the GPS monitor server 3. Thereafter, the GPS terminal 1 starts, upon reception of the GPS supplementary information, reception of the GPS signals transmitted from the GPS satellites 2.

Namely, unlike the prior arts, the GPS data which is already obtained with the GPS monitor server 3 can be obtained as the GPS supplementary information at the side of the GPS terminal 1 only by providing the function to receive the radio wave signal transmitted from the FM multiplex broadcast station 4, for example the FM-RF unit 13 and FM-BB unit 14, even if a function to generate a signal is not provided unlike the mobile telephone set.

Therefore, the GPS terminal 1 can obtain the Almanac data within a short period of time with a more simplified structure in view of more quickly setting up the navigation function. Moreover, since the Ephemeris data can also be received by the GPS supplementary information, if it is difficult to receive the GPS signals, the GPS terminal 1 side can obtain the detail navigation message in regard to the GPS satellite 2 to be seized on the basis of the data obtained via the FM multiplex broadcast station 4. In addition, the user can use more easily the system because the user can be freed from the communication charge to obtain the Almanac data just like the case of making access to the server using a mobile telephone set.

Moreover, according to this embodiment, since the GPS monitor server 3 is provided with the function of the D-GPS reference station, the GPS terminal 1 side can also receive the D-GPS supplementary data together with the GPS supplementary information in order to realize a high precision navigation process.

Moreover, the FM multiplex broadcast station 4 can easily transmit the GPS supplementary information by combining this information into the character broadcast. In addition, since the own broadcast station name and position information are also transmitted, the GPS terminal 1 side can assume rough position based on the broadcast station name or position information and can also select more quickly the GPS satellite 2 to be seized depending on the rough position on the occasion of seizing the GPS satellite 2 in the measuring process.

Furthermore, the GPS terminal 1 compensates for the time of RTC 11 by utilizing the time information transmitted from the FM multiplex broadcast station 4. Therefore it can easily set up the synchronization of data for the GPS monitor server 3 and thereby can appropriately utilize the data obtained for the navigation by accurately determining the validity of data.

Moreover, since the GPS terminal 1 subsequently selects, upon acquisition of the present position information after reception of the GPS signal is started, the transmission frequency of the FM multiplex broadcast station 4 based on the present position information and the FM station database 15, it is now possible, even in the condition that the GPS terminal 1 is loaded to the automobile 50 moving at a comparatively higher speed for application into the navigation, to continuously receive the GPS supplementary information by obtaining, from the database 15, the frequency of the FM multiplex broadcast station 4 to be received depending on the present position. If reception of the GPS supplementary information is disabled, the GPS terminal 1 immediately starts reception of the GPS signal transmitted from the GPS satellite 2. Therefore it can select the optimum receiving condition depending on the situation.

Second Embodiment

In the second embodiment shown in FIG. 7, basic structure of a GPS terminal 1A is similar to the GPS terminal 1 of the first embodiment, but a GPS-BB unit 8A, a CPU 9A, a FM-RF unit 13A and a FM-BB unit 14A are constructed to operate even in the condition that a power switch (not shown) of the GPS terminal 1A is turned off.

Figure 8:
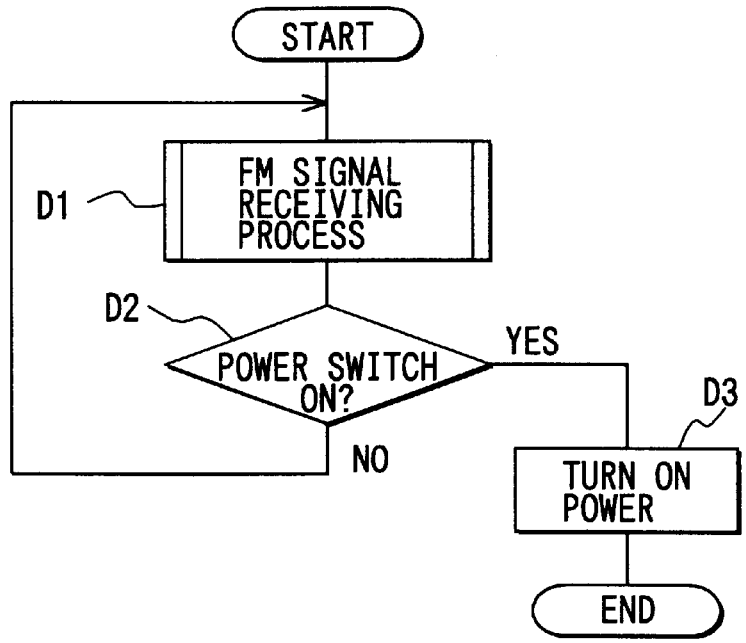
FIG. 8 is a flow diagram showing processes executed when the power switch of the GPS terminal is turned off in the second embodiment.

The CPU 9A executes the process shown in FIG. 8, when the power switch of the GPS terminal 1A is turned off. The CPU 9A executes the FM multiplex signal receiving process at step D1 until a user executes manipulation to turn on the power switch. If the power switch is turned on (step D2, "YES"), the CPU 9A turns on the power supply (step D3).

FIG. 9 is a flow diagram showing the FM multiplex signal receiving process of step D1. The processes at steps E1 to E8 are same as the processes at steps B2 to B9 in the network measuring process (FIG. 5) of the first embodiment. The CPU 9A completes, upon execution of process at step E8, the FM multiplex signal receiving process and returns to the process of FIG. 8.

Figure 10:
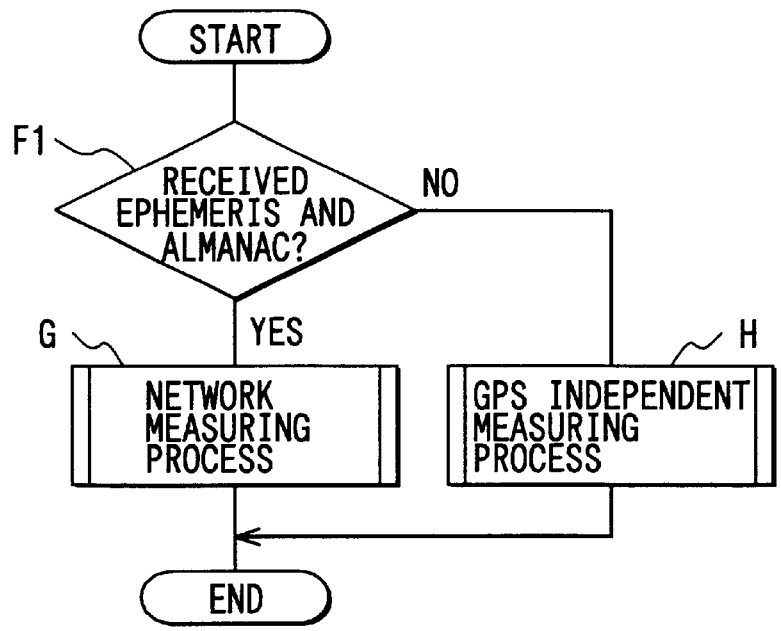
FIG. 10 is a flow diagram showing processes executed when the power switch of the GPS terminal is turned on in the second embodiment.
Figure 11:
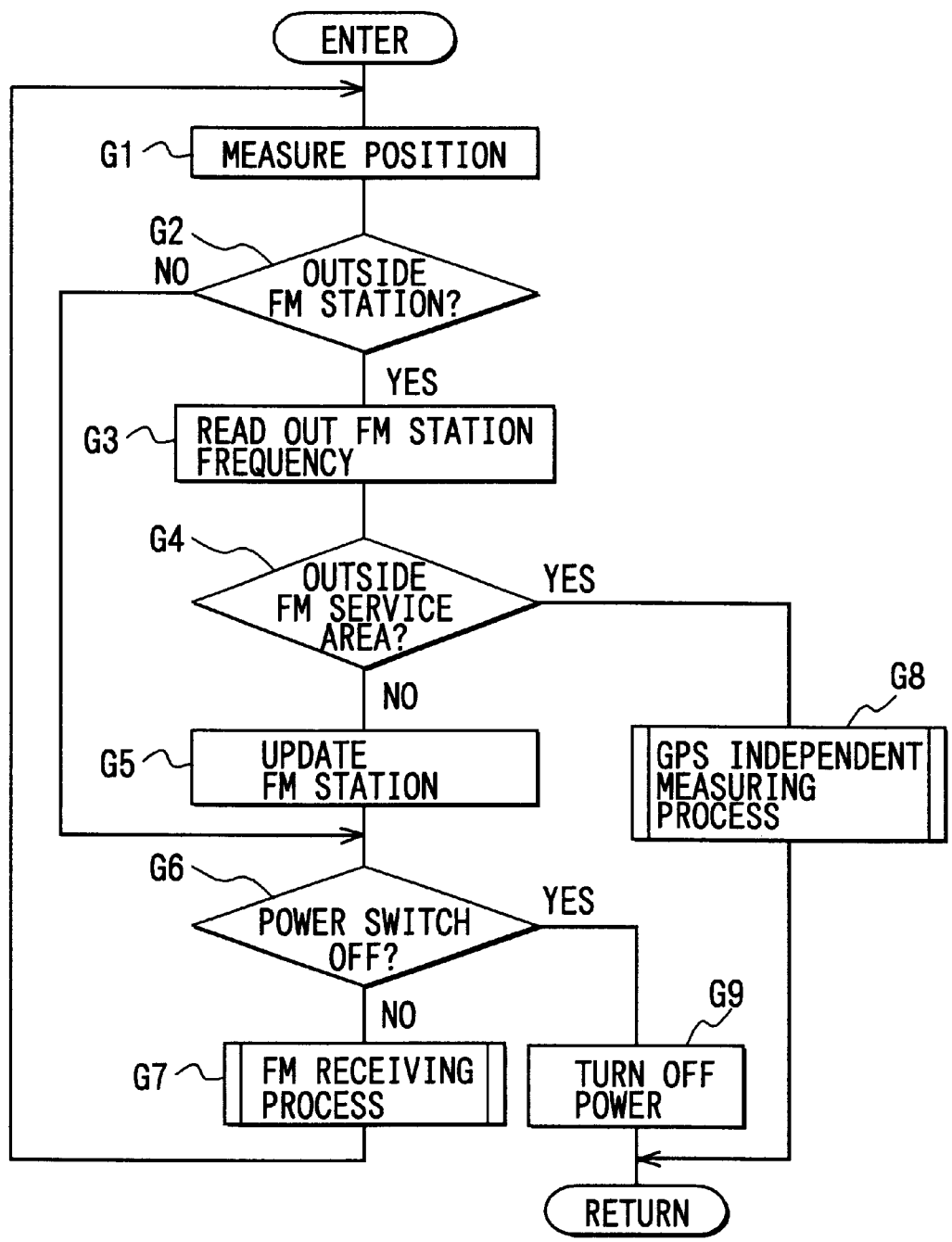
FIG. 11 is a flow diagram showing a network measuring process executed in the second embodiment.

Next, FIG. 10 shows the process executed when the power supply to the GPS terminal 1A is turned on. The CPU 9A refers to the predetermined area of the memory 10 to determine whether the Ephemeris and Almanac data has already been received or not at step E7 of the FM multiplex signal receiving process during the period wherein the power switch is turned off (step F1). When such data has already been received ("YES"), the CPU 9A executes the network measuring process (step G) shown in FIG. 11. When such data have not yet been received ("NO"), the CPU 9A executes the GPS independent measuring process (step H) shown in FIG. 12.

steps G1 to G4 for the network measuring process shown in FIG. 11 are the same as the processes of steps B11 to B14 for the network measuring process B of the first embodiment. The CPU 9A updates, upon determination of "NO" at step G4, the FM multiplex broadcast station 4 to be received to the station selected from the FM station database 15 at step G3 (step G5).

Thereafter, the CPU 9A determines whether the user has executed or not the manipulation to turn off the power switch (step G6). When the user has executed such manipulation (YES), the power switch is turned off (step G8). When the user does not execute such manipulation (NO), the CPU 9A executes the FM multiplex signal receiving process of FIG. 9 and executes in trial the process to acquire a new GPS supplementary information (step G7).

Figure 12:
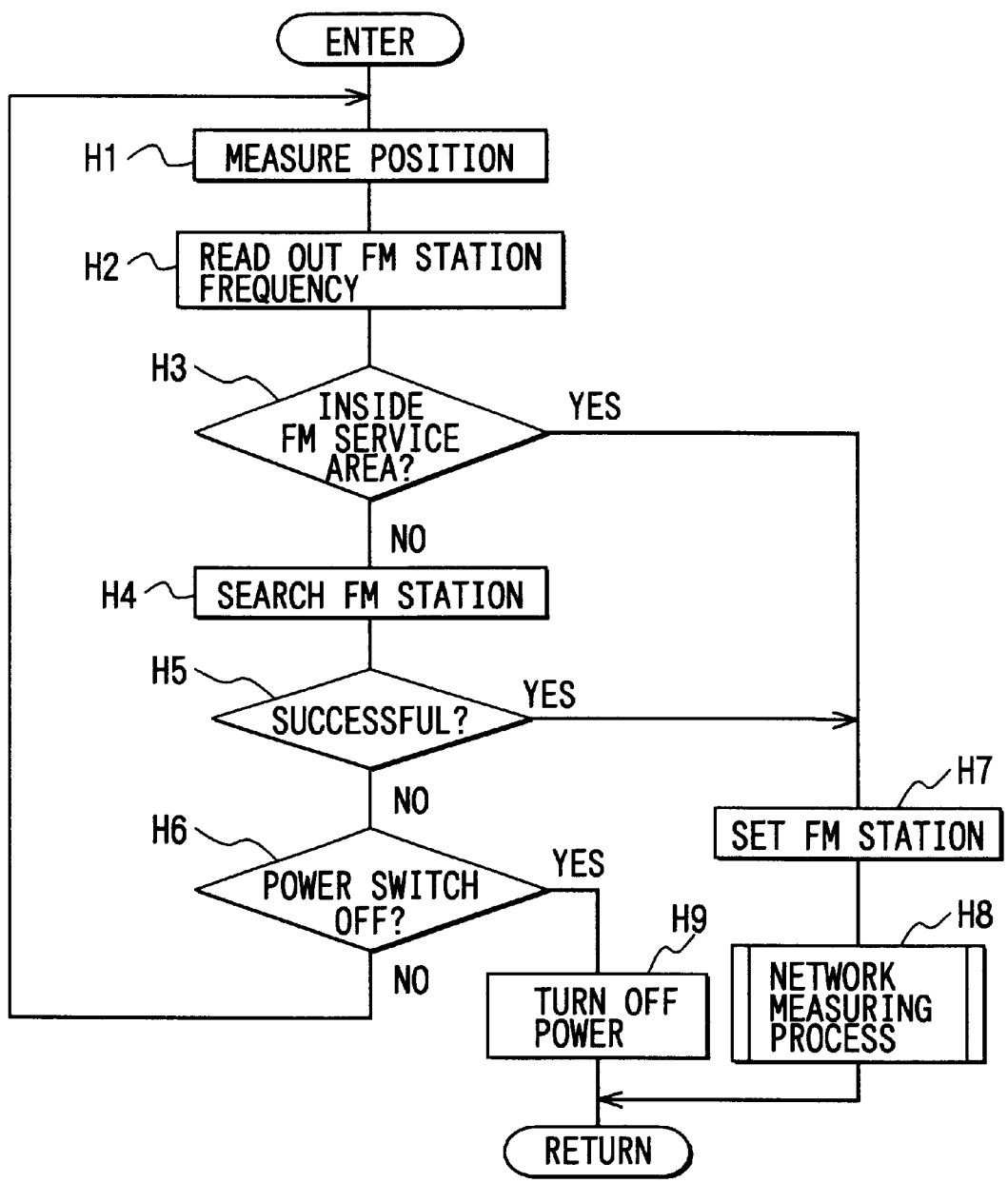
FIG. 12 is a flow diagram showing a GPS individual measuring process executed in the second embodiment.

In the GPS independent measuring process shown in FIG. 12, the CPU 9A starts, like steps C4, C5, reception of the GPS signals transmitted from the GPS satellites 2 (step H1). It then reads, from the FM station database 15, the frequency of the FM multiplex broadcast station 4 corresponding to the transmission area to which the present position obtained from the result of measurement belongs (step H2). When the GPS terminal 1A is located within the transmission area of the FM multiplex broadcast station 4 (step H3, "YES"), the CPU 9A makes the setting to receive the signal from the FM multiplex broadcast station 4 (step H7). It then shifts its processing to the network measuring process (H8).

Meanwhile, when the GPS terminal 1A is not located within the transmission area of the FM multiplex broadcast station 4 selected from the FM station database 15 (step H3, "NO"), the CPU 9A searches, at step H3, the FM broadcast station 4 to be received at this time point as in the case of step C1 (step H4). When the signal of a certain FM multiplex broadcast station 4 can be received as a result of successful search (step H5, "YES"), the CPU 9A shifts its processing to step H7 to set the FM multiplex broadcast station. When the search fails ("NO"), the CPU 9A returns to step H1 if the user does not execute manipulation to turn off the power switch (step H6, "NO"). When the user has executed the manipulation to turn off the power switch (step H6, "YES"), the CPU 9A shifts its processing to step H9 to turn off the power.

According to the second embodiment, the GPS terminal 1A enables the operations of the RM-RF unit 13A and the FM-BB unit 14A for receiving the GPS supplementary information even when the supply of power to the GPS-RF unit 7 to execute the navigation function is stopped. When the terminal 1A is driven through the supply of power, the navigation function can be set up immediately based on the GPS supplementary information already obtained at this time point.

Third Embodiment

Figure 13:
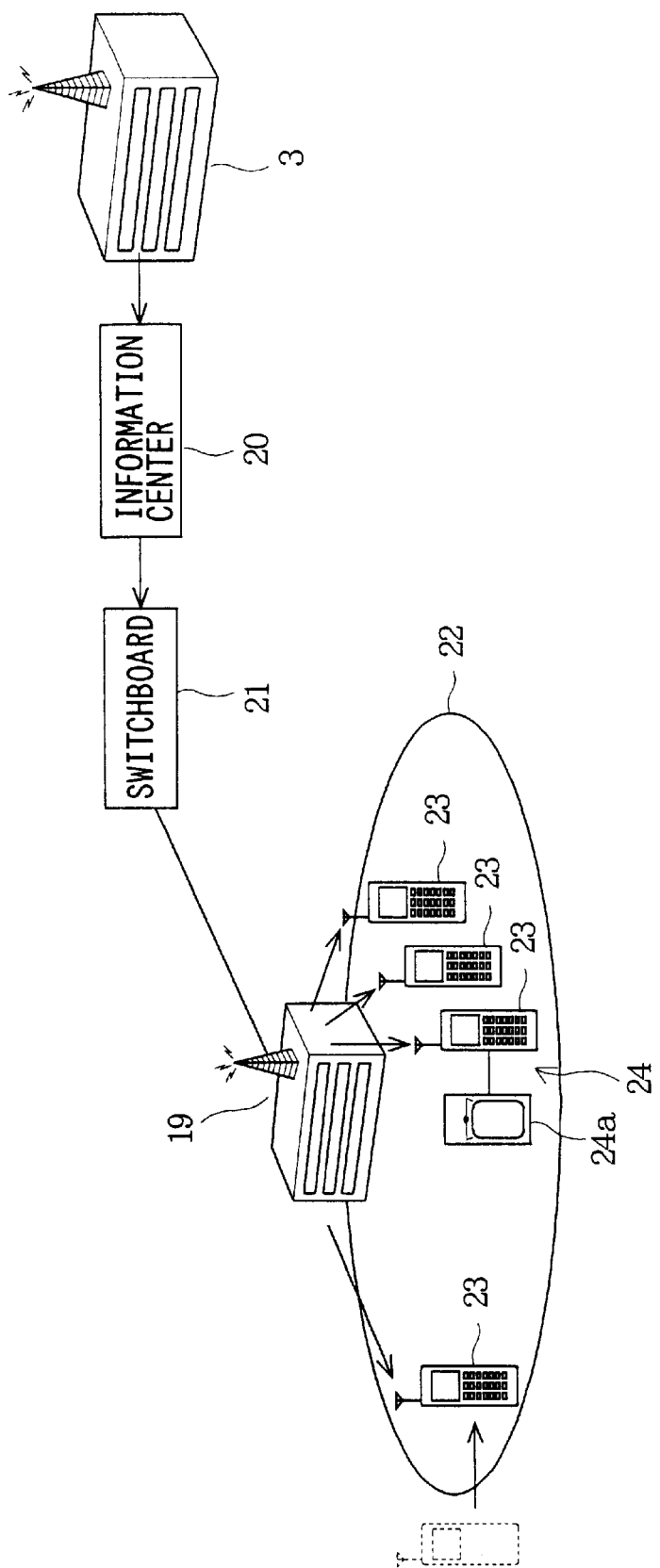
FIG. 13 is a schematic diagram showing a navigation system according to a third embodiment of the present invention.

In the third embodiment shown in FIG. 13, a base station 19 for mobile telephones to execute the cell broadcast service (CBS) in a mobile telephone system is used as a transmitting station. This cell broadcast service (CBS) is now provided by the J-PHONE Company Limited, Japan for users of mobile telephones set under the service name of "J-Sky Station".

The base station 19 for mobile telephone system receives various service contents via a switchboard 21 from an information center 20. These service contents are provided from communication companies and other enterprises basically free of charge (but partly of charge). Various information pieces are transmitted, like the simultaneous broadcast, in the predetermined period (Push Distribution), to a mobile telephone set 23 of the type corresponding to the services located within the communication area (cell) 22 of own station using the descending control channel assuring reception in the waiting condition.

Thereby, the D-GPS compensation data and GPS supplementary information transmitted from the GPS monitor server 3 are provided as a kind of contents in the information center 20. Accordingly, the base station 19 for mobile telephones transmits, in the predetermined period, the signal including the D-GPS compensation data and GPS supplementary information as the contents of CBS.

Here, a GPS terminal 24 including the mobile telephone set 23 is formed in order to utilize the D-GPS compensation data and GPS supplementary information. In practice, the mobile telephone set 23 is provided in place of the FM antenna 12 of the GPS terminal 1, FM-RF unit 13 and FM-BB unit 14 in the first embodiment. A communication interface for the mobile telephone set 23 is also provided as required. The mobile telephone set 23 is set to receive the corresponding contents. Thereby, the mobile telephone set 23 of the GPS terminal 24 can receive the contents transmitted from the base station 19 for mobile telephone and further transfers the received D-GPS compensation data and GPS supplementary information to a main unit 24a of the GPS terminal 24.

According to the third embodiment, the base station 19 for mobile telephone used to provide the cell broadcast service in the mobile telephone system is utilized as the transmitting station of the navigation system. Therefore, the GPS terminal 24 can receive the D-GPS compensation data and GPS supplementary information included in the contents transmitted in the manner of simultaneous transmission in the predetermined period from the base station 19 for mobile telephone in view of utilizing such data for the navigation system.

Modification

The present invention is not limited only to the embodiments explained above and shown in the drawings and allows following modifications and alterations.

The function to compensate for the time of RTC by utilizing the time information transmitted from the FM multiplex broadcast station 4 may be provided as required.

The function to automatically select, from the FM station database 15, the FM multiplex broadcast station 4 depending on the broadcast station name and position information transmitted from the FM multiplex broadcast station 4 may also be provided as required.

The GPS terminal may be constructed to always obtain at least the Almanac data from supplementary information via a transmitting station.

The base station is not always a D-GPS reference station. Moreover, the transmitting station may be an AM broadcast station, a television station or an exclusive station to transmit the GPS supplementary information. In short, it is enough for the transmitting station to be able to transmit a signal to the predetermined area.

The GPS terminal may also be used for so-called human navigation when a pedestrian (user) carries a mobile telephone set. The GPS terminal may also be constructed as a navigation apparatus comprising a CD-ROM and DVD-ROM driver to read the map data.

It is enough for the GPS supplementary information to include at least the Almanac data. Even in this case, the navigation function of the GPS terminal can be set up quickly.

The transmitting station may transmit any one of own transmitting station name and position information and is also allowed not to always transmit such data or information.

A number of embodiments of the invention have been described. Nevertheless, it will be understood that various modifications may be made without departing from the spirit and scope of the invention. Accordingly, other embodiments are within the scope of the following claims.

What is claimed is:

1. A navigation system comprising:

a base station for receiving, on a ground, various GPS signals transmitted from a plurality of GPS satellites;

a one-way transmitting station for transmitting at least supplementary information including Almanac data in a navigation message of the GPS signals to a predetermined area using a radio wave signal, the one-way transmitting station being capable of transmitting but not receiving radio wave signals; and a GPS terminal for receiving the supplementary information transmitted by the transmitting station and then starting reception of the GPS signals transmitted from the GPS satellites.

2. A navigation system according to claim 1, wherein the transmitting station transmits Ephemeris data in the navigation message.

3. A navigation system according to claim 1, wherein the transmitting station also transmits position information of the transmitting station.

4. A navigation system according to claim 1, wherein the transmitting station is a FM multiplex broadcast station.

5. A navigation system according to claim 1, wherein the transmitting station is a television broadcast station.

6. A navigation system according to claim 4, wherein the transmitting station also transmits a station name of the broadcast station.

7. A navigation system according to claim 1, wherein the transmitting station is a base station for mobile telephone which can provide a cell broadcast service in a mobile telephone system.

8. A navigation system according to claim 1, wherein the base station is a D-GPS reference station.

9. A navigation system according to claim 1, wherein the GPS terminal utilizes time information transmitted from the transmitting station in order to set up synchronization of data for a side of the base station.

10. A navigation system according to claim 1, wherein the GPS terminal has a database in regard to a transmission area and transmission frequency of the transmitting station, and subsequently selects, upon acquisition of present position information after a start of reception of the GPS signal, a transmission frequency of the transmitting station based on the present position information and the database.

11. A navigation system according to claim 1, wherein the GPS terminal immediately starts reception of the GPS signals transmitted from the GPS satellites when reception of the supplementary information is impossible.

12. A navigation system according to claim 1, wherein the GPS terminal enables operations of a functional portion for receiving the supplementary information even when supply of power to the portion to execute navigation function is stopped.

13. A navigation system according to claim 1, wherein the GPS terminal is mounted in a vehicle.

14. A navigation method comprising steps of:

receiving, by a base station on a ground, GPS signals from a plurality of GPS satellites, each GPS signal including Almanac data and Ephemeris data;

transmitting, from a one-way transmitting station on the ground, a radio signal with supplementary data including at least the Almanac data received by the base station, the one-way transmitting station being capable of transmitting but not receiving radio signals;

receiving, by a mobile navigation terminal, the supplementary data transmitted from the transmitting station;

selecting, by the mobile navigation terminal, appropriate GPS satellites based on the supplementary data received by the mobile navigation terminal, so that navigation function is attained by using the GPS signals of the selected GPS satellites.

15. A navigation method according to claim 14, wherein receiving of the supplementary data is performed when supply of power to the mobile navigation terminal is manually started.

16. A navigation method according to claim 14, wherein receiving of the supplementary data is performed before supply of power to the mobile navigation terminal is manually started.

17. A navigation method according to claim 16, wherein supply of power to a part of the mobile navigation terminal is continued to receive the supplementary data from the transmitting station after supply of power to the mobile navigation terminal is stopped manually.

18. A navigation method according to claim 14, wherein the supplementary data includes Ephemeris data.

19. A navigation method according to claim 14, wherein the radio signal transmitted from the transmitting station is a broadcast signal of a broadcast station.

* * * * *